Patented June 24, 1924.

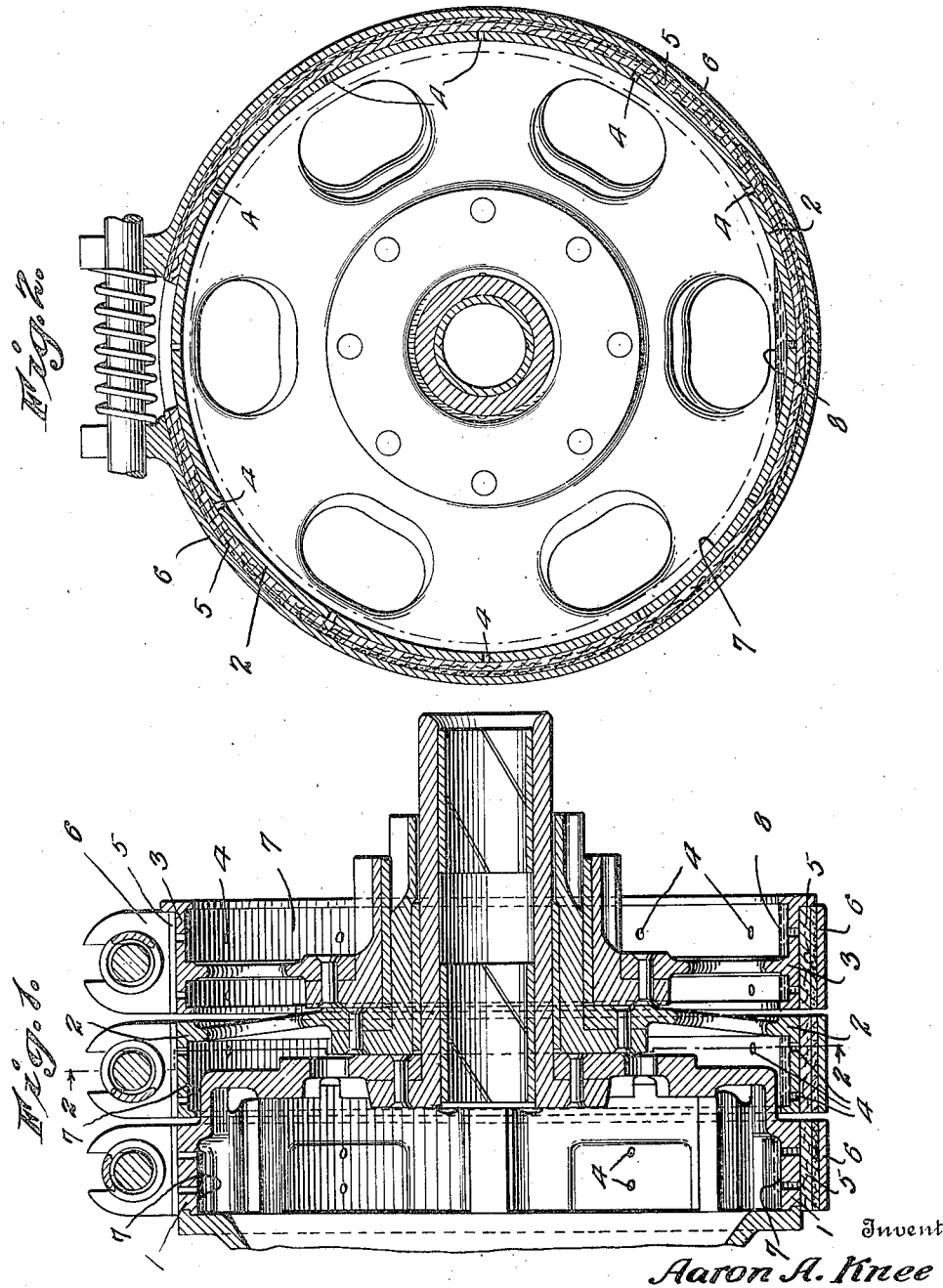

1,498,877

UNITED STATES PATENT OFFICE.

AARON A. KNEE AND WILLIAM E. JORDAN, OF CHARLOTTE, NORTH CAROLINA.

PLANETARY TRANSMISSION DRUM.

Application filed May 17, 1923. Serial No. 639,666.

*To all whom it may concern:*

Be it known that we, AARON A. KNEE and WILLIAM E. JORDAN, citizens of the United States, residing at Charlotte, in the county of Mecklenburg and State of North Carolina, have invented a new and useful Improvement in Planetary Transmission Drums, of which the following is a specification.

The object of our invention is to provide novel means for oiling the transmission band lining of planetary transmission drums, to prevent the linings from becoming glazed and thereafter failing to function properly. We attain the objects of our invention by the device illustrated in the accompanying drawings, in which—

Figure 1 is a section through the planetary transmission drums, showing the improvement; and Fig. 2 is a section on line 2—2 of Fig. 1.

Like numerals designate like parts in both of the views.

Referring to the accompanying drawings, we provide planetary transmission drums 1, 2 and 3, arranged in the conventional manner. All three of the drums are provided with a series of spaced openings or slots 4, of appropriate size and shape to permit oil to pass through onto the transmission lining 5 of the brake band, slow speed band or reverse band of the respective drums. We further provide the transmission drums 1, 2 and 3 with the novel shallow annular oil grooves or channel 7, said channels extending approximately the width of the drum to keep a small quantity of oil 8 constantly within the drums, as shown in the drawings.

The transmission band lining 5 is made of such material that it does not absorb oil quickly and when the brakes or low gear are used for a long distance, all of the oil is squeezed out of the brake lining or the transmission lining 5 and it is only a short while until the drum or lining gets very hot, causing the lining to burn, glaze and carbonize.

In our invention, the series of openings 4 permit the oil to pass through from the inside of the drums to the brake or transmission lining 5 while it is pressed against the drum. This occurs regardless of how tight or how close the lining is pressed to the drum. Enough oil enters the lining to keep it properly lubricated and to prevent burning, glazing and carbonizing, greatly reducing the wear on the drum and on the band and preventing jerking or grabbing of the brake drum. This in turn adds to the life of the entire mechanism of the automobile or other machinery to which the invention is applied; in fact, it causes the transmission band to grip the drum gently and evenly, with little heat and friction.

The oil 8 in the suitable annular channel 7 flows through the perforations 4 onto the linings 5, as illustrated in Fig. 2.

What we claim is:

In a device of the class described, planetary transmission drums having suitable annular oil channels on the inner surfaces of the drums, said channels extending approximately over the width of the drum to keep a small quantity of oil constantly within the drums, and a series of spaced perforations extending from said oil channels to the outer surfaces of the drums, whereby to permit of oil seeping through and lubricating the transmission linings, for the purposes hereinbefore described.

AARON A. KNEE.
WILLIAM E. JORDAN.